June 17, 1969  D. F. HUTTENLOCHER  3,450,338
HERMETIC REFRIGERANT MOTOR COMPRESSOR UNIT
Filed Dec. 20, 1967

INVENTOR.
DIETRICH F. HUTTENLOCHER
BY *Walter E. Rule*
HIS ATTORNEY

United States Patent Office 3,450,338
Patented June 17, 1969

3,450,338
HERMETIC REFRIGERANT MOTOR COMPRESSOR UNIT
Dietrich F. Huttenlocher, Louisville, Ky., assignor to General Electric Company, a corporation of New York
Filed Dec. 20, 1967, Ser. No. 692,167
Int. Cl. F04b 39/02; F16n 1/00; F01m 1/02
U.S. Cl. 230—206          6 Claims

ABSTRACT OF THE DISCLOSURE

A hermetic refrigerant motor-compressor unit including aluminum motor windings having an insulating coating of a phenolic resin modified polyvinyl formal resin includes a small amount of zinc dialkyldithiophosphate in the lubricant to inhibit degradation of the insulated coating by the dichlorodifluoromethane refrigerant.

---

Background of the invention

Figure 1:
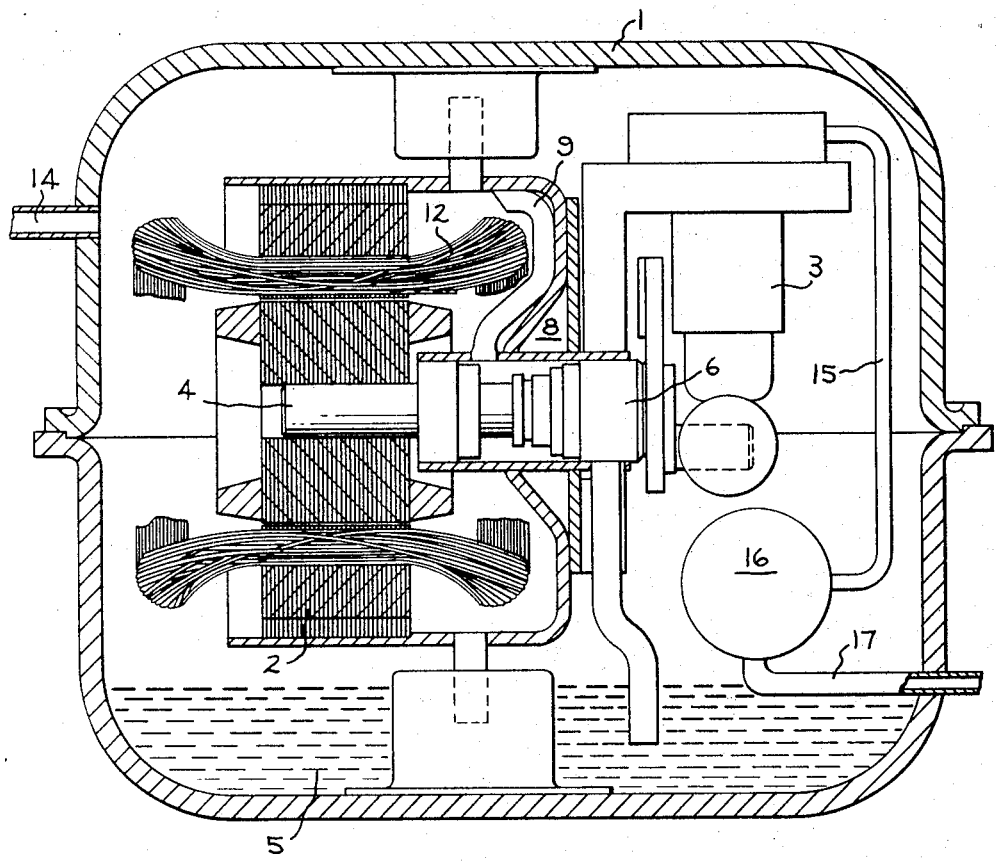

Hermetic motor-compressor units for refrigeration system applications are well known. These units comprise a unitary motor-compressor component housed within a hermetically sealed casing and, depending upon how the unit is connected into the refrigeration system, the casing will be filled with either low pressure or high pressure refrigerant. A body of lubricant is provided in the bottom portion of the casing for lubricating the bearing structure of the motor compressor component and in many designs, this same oil is also circulated over the motor windings for the purpose of cooling the motor structure.

Many motors presently used in such units include windings of a copper conductor having applied directly thereto an insulating coating comprising the heat reaction product of a phenol-formaldehyde resin and a polyvinyl formal resin, such resin coatings being described for example in Patents Nos. 2,730,466 Daszewski and 3,068,189 Levin et al. In addition to the phenol-formaldehyde resin and the polyvinyl formal, the heat hardened coating may include other modifying resin forming ingredients as described in these patents.

Millions of hermetic motor compressor units including such insulated copper windings have been successfully used in hermetic refrigeration systems including dichlorodifluoromethane (R12) as the refrigerant.

Since the modified polyvinyl formal insulating coating completely coats or covers the conductor, it has generally been assumed that any defficiencies which might be experienced with regards to the insulation were inherent to the insulating material itself. It was therefore most surprising that the simple substitution of insulated aluminum conductors for the insulated copper conductors in the motor of a hermetic motor-compressor unit resulted in a rapid degradation, as evidenced by blackening and loss of flexibility of the polyvinyl formal coating by exposure to refrigerant 12 at the elevated temperatures normally experienced in such units.

While the exact mechanism of the polyvinyl formal degradation has not been completely determined, the data indicates that in addition to the polymer degradation, the refrigerant 12 (dichlorodifluoromethane) is converted to refrigerant 22 (monochlorodifluoromethane). A similar conversion of the refrigerant 12 to refrigerant 22 has previously been observed in the reaction between the hydrocarbon oils and the refrigerant 12 and it has been found, as is described and claimed in the copending application of Hans O. Spauschus and Dietrich H. Huttenlocher, Ser. No. 386,401 filed July 30, 1964 (now Patent 3,375,197) and assigned to the same assignee as the present invention, that a certain class of metal dithiophosphate esters were effective in inhibiting this reaction. However, the degradation of the polyvinyl formal coating or enamel on aluminum conductors takes place in a refrigerant 12 atmosphere regardless of whether oil is present or absent.

Summary of the invention

The present invention is based on the discovery that degradation of a phenolic resin modified polyvinyl formal insulating coating or enamel on aluminum conductor windings of the motor element of a hermetic motor-compressor unit containing dichlorodifluoromethane as a refrigerant can be inhibited by the addition of a small amount, for example, from 0.1 to 3% by weight, of a compound of the formula

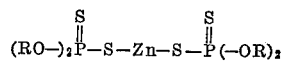

wherein R represents the same or different alkyl radicals containing from six to eight carbon atoms.

A brief description of the drawing

Figure 2:
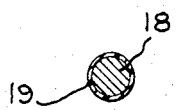

In the accompanying drawing:
FIGURE 1 is a sectional view of a hermetically sealed motor-compressor unit: and
FIGURE 2 is a sectional view of one of the windings forming part of the motor component of the unit.

Description of the preferred embodiment

With reference to the FIGURE 1 of the accompanying drawing, there is illustrated a hermetic refrigerant motor-compressor unit comprising a hermetic casing 1 containing a unitary motor-compressor component including a motor 2, and a compressor 3 operatively connected by means of a drive shaft 4. A body of oil or lubricant 5 is contained within the lower portion of the casing 1 and this lubricant is circulated by means of an oil pump 6 for delivery to various portions of the bearing structure 8, the compressor 3 and also through an oil feed tube 9 onto the motor 2 including the windings 12 forming part of the motor structure. The oil flowing over the windings 12 serves to remove the heat losses therefrom.

Compressors of the type thus far described may be designed to be connected into a refrigerant system so that the casing 1 contains either low pressure or high pressure refrigerant. In the illustrated embodiment, the unit is designed to operate as a low pressure unit so that low pressure refrigerant enters the casing through a suction line 14 and passes through the interior of the casing to a compressor inlet (not shown) for entrance into the compressor in which the refrigerant is compressed. The compressed refrigerant discharged from the compressor flows through a discharge line 15 into a muffler 16 and then through a discharge conduit 17 to the condenser component of the refrigeration system.

In accordance with the present invention, the winding 12 comprises aluminum conductors 18 provided with an insulating coating comprising the heat hardened phenol-formaldehyde modified polyvinyl formal resin 19. Also in order to prevent the refrigerant 12 (dichlorodifluoromethane) from degrading the polyvinyl formal insulation, there is included in the body of oil 5 an effective amount of a compound of the formula

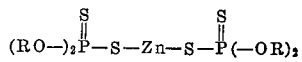

wherein R represents the same or different alkyl radicals containing at least six carbon atoms. Preferably the additive is a zinc dithiophosphate ester in which the alkyl radicals contain from 6 to 8 carbon atoms.

In order to demonstrate the effectiveness of such zinc dithiophosphate esters in inhibiting the degradation of the modified polyvinyl formal insulation on aluminum conductors, sealed tubes were prepared containing combinations of R12 refrigerant, aluminum or copper conductors insulated with modified polyvinyl formal insulation, and various additives with and without the addition of oil. The tubes were heated for 14 days at 175° C. and the condition of the insulation noted. The contents of some of the tubes were also analyzed for R12 decomposition which is known (H. O. Spauschus & C. C. Doderer, ASHRAE Journal, 3, No. 2, 65 (1961) to involve the formation of monochlorodifluoromethane (R22) in accordance with the following type of reaction:

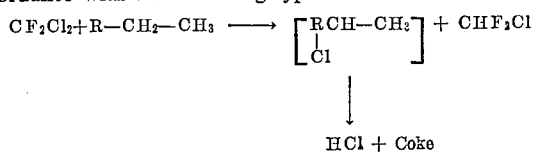

The following table sets forth the results of these tests.

TABLE 1

| Tube No. | Conductor | Tube Contents [1] | Condition of Coating | Percent of Volume R22 Formed |
|---|---|---|---|---|
| 6M-1,2 | Al | Oil N2 [2] | Black, cracking and peeling | 0.05 |
| 6M-4,5 | Al | Oil N2+0.1% Zinc dioctyl dithiophosphate. | Golden brown flexible (no change from original). | 0.02 |
| 7M-1,2 | Al | Oil Na+0.2% Antimony di-2-ethyl-hexyl dithiophosphate. | Black | |
| 7M-3,4 | Al | Oil N2+0.1% Zinc dihexyldithiophosphate. | Golden brown (unchanged) | |
| 7M-7,8 | Al | Oil N2 | Black | |
| 7M-9,10 | Al | Oil N2+0.2% Ammonium hexyl dithiophosphate. | Brown (between 7M-3,4 and 7M-7,8). | |
| 7M-11,12 | Al | Oil N2+1% tris (trifluoro-m-cresyl) phosphate. | Black | |
| BD-1 | Al | No oil or additive | Black, cracked and peeled | 0.5 |
| Cu-1 | Cu | Oil N2 | Golden brown (no change) | 0.006 |

[1] All tubes contained (1) a 3″ length of twisted aluminum wire coated with a golden brown coating of a phenol-formaldehyde modified polyvinyl formal resin and (2) R12 refrigerant. For comparison purposes, it should be noted that similar tests without additives to the oil or with addition of some of the effective additives such as zinc dioctyldithiophosphate and zinc dihexyldithiophosphate, copper wires coated with the same resin exhibited no change without the additives or with the additives.

[2] The N2 oil was a medium refined naphthenic oil recovered from Gulf Coast Crudes with a viscosity of 150 Saybolt Universal Seconds at 100° F.

Considering the results of these tests, it will be noted that zinc dialkyldithiophosphate additives (tubes No. 6M-4,5 and 7M-3,4) effectively inhibit degradation of the polyvinyl formal resin insulation on the aluminum wire in the presence of the dichlorodifluoromethane refrigerant. Also a comparison of the test 6M-1,2 and BD-1 indicates that the lubricating oil is not a critical factor or, in other words, that the lubricating oil apparently does not enter into whatever reactions are involved in the degradation of the coating on the aluminum wire by the R12 refrigerant. Finally, whatever the nature of the degradation phenomenon, the blackening, cracking and peeling of the polyvinyl formal resin insulation is specific to the insulation on the aluminum conductors as shown by test Cu-1.

What I claim as new and desire to secure by Letters Patent of the United States is:

1. A hermetically sealed refrigeration motor compressor unit containing dichlorodifluoromethane as a refrigerant and comprising a motor including windings of aluminum wire having thereon an insulating coating of a heat hardened phenol-formaldehyde modified polyvinyl formal resin, said unit containing zinc dialkyldithiophosphate in an amount sufficient to prevent degradation of said insulating coating on said wire by said refrigerant.

2. The unit of claim 1 in which said zinc dialkyldithiophosphate is zinc dioctyldithiophosphate.

3. The unit of claim 1 in which said zinc dialkyldithiophosphate is zinc dihexyldithiophosphate.

4. A hermetic refrigeration motor-compressor unit comprising a sealed casing containing a compressor, a motor for driving said compressor, a lubricant in said casing for lubricating said compressor and cooling said motor, and dichlorodifluoromethane as a refrigerant;

said motor including aluminum windings having thereon an insulation consisting essentially of a heat hardened phenolic resin modified polyvinyl formal;

said lubricant containing from 0.1 to 3 percent by weight of a compound of the formula

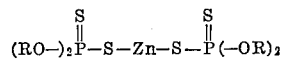

wherein R represents the same or different alkyl radicals containing from six to eight carbon atoms, said compound being effective to inhibit degradation of said insulation by said dichlorodifluoromethane.

5. The unit of claim 4 in which R represents an actyl radical.

6. The unit of claim 4 in which R represents a hexyl radical.

References Cited
UNITED STATES PATENTS
2,822,333    2/1958    Keller    184—1
2,842,112    7/1958    Philips et al.    184—1

ROBERT M. WALKER, *Primary Examiner.*

U.S. Cl. X.R.

184—1